United States Patent [19]
Takayama et al.

[11] Patent Number: 5,785,999
[45] Date of Patent: Jul. 28, 1998

[54] INJECTION APPARATUS FOR MOLDING SYNTHETIC RESIN HOLLOW OR FOAMED BODY

[75] Inventors: Kazutoshi Takayama; Kiyoto Takizawa, both of Nagano-ken, Japan

[73] Assignee: Nissei Plastic Industrial Co., Ltd., Nagano-ken, Japan

[21] Appl. No.: 791,258

[22] Filed: Jan. 30, 1997

[51] Int. Cl.[6] .................................... B29C 45/18
[52] U.S. Cl. ..................... 425/130; 264/572; 425/561
[58] Field of Search ........................ 425/4 R, 130, 425/561; 264/572

[56] References Cited

U.S. PATENT DOCUMENTS

| | | | |
|---|---|---|---|
| 4,101,617 | 7/1978 | Friederich | 264/572 |
| 4,106,887 | 8/1978 | Yasuike et al. | 264/572 |
| 5,030,077 | 7/1991 | Orimoto et al. | 425/130 |
| 5,054,689 | 10/1991 | Hunerberg et al. | 264/572 |
| 5,080,570 | 1/1992 | Baxi et al. | 264/572 |
| 5,131,830 | 7/1992 | Orimoto et al. | 425/130 |
| 5,151,278 | 9/1992 | Baxi et al. | 425/130 |
| 5,505,891 | 4/1996 | Shah | 425/130 |
| 5,670,112 | 9/1997 | Csonger et al. | 425/130 |

FOREIGN PATENT DOCUMENTS

| | | |
|---|---|---|
| 59-383 | 1/1984 | Japan . |
| 1-28690 | 6/1989 | Japan . |
| 4-71218 | 6/1992 | Japan . |

*Primary Examiner*—Robert Davis
*Attorney, Agent, or Firm*—Weingarten, Schurgin, Gagnebin & Hayes LLP

[57] ABSTRACT

An injection apparatus capable of carrying out injection and filling of a resin and injection of a gas making use of an injection screw or injection plunger for the injection of a high-pressure gas comprises an injection screw 5 having a conical injection head 3 at the front end thereof and a ring valve 4 around a rear portion of the injection head, an injection cylinder the interior of a front end portion of which equipped with a nozzle member is formed as a tapered surface in accordance with the injection head 3 and can be closed by its contact with the injection head 3 and which contains the injection screw 5, gas flow passages 12 and 8 provided from the front end of the injection head 3 to a rear end portion of the injection screw 5, an opening/closing pin 17 inserted into the gas flow passage 12 in the injection head in such a manner that it can move together with a piston at the rear end of the injection head, and an actuation gas flow passage 10, provided inside the gas flow passage 8, for applying pressure to the piston 16 so as to close the gas flow passage 12 with the opening/closing pin 17.

2 Claims, 3 Drawing Sheets

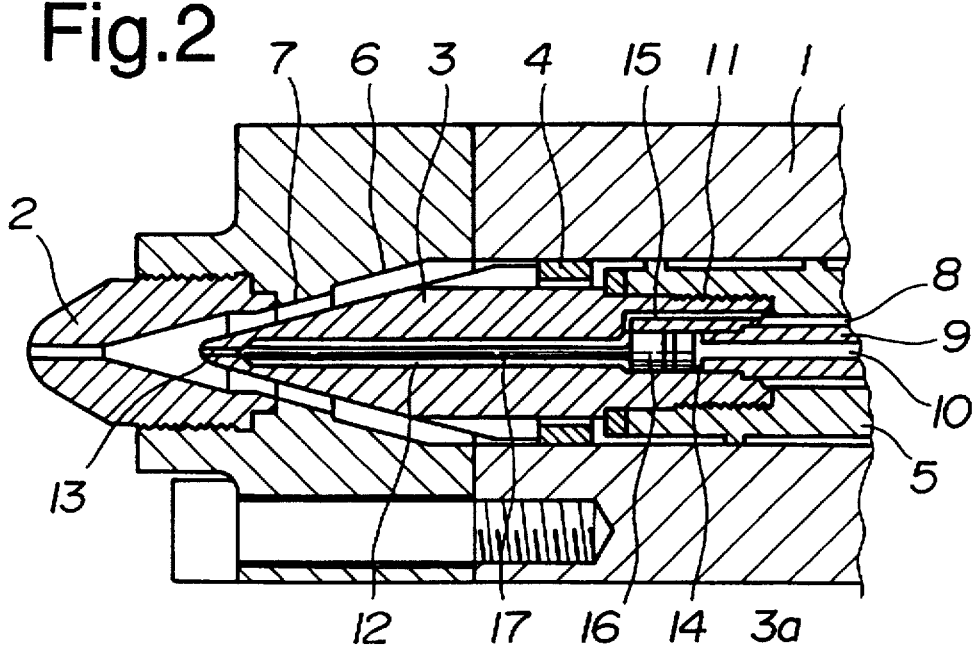
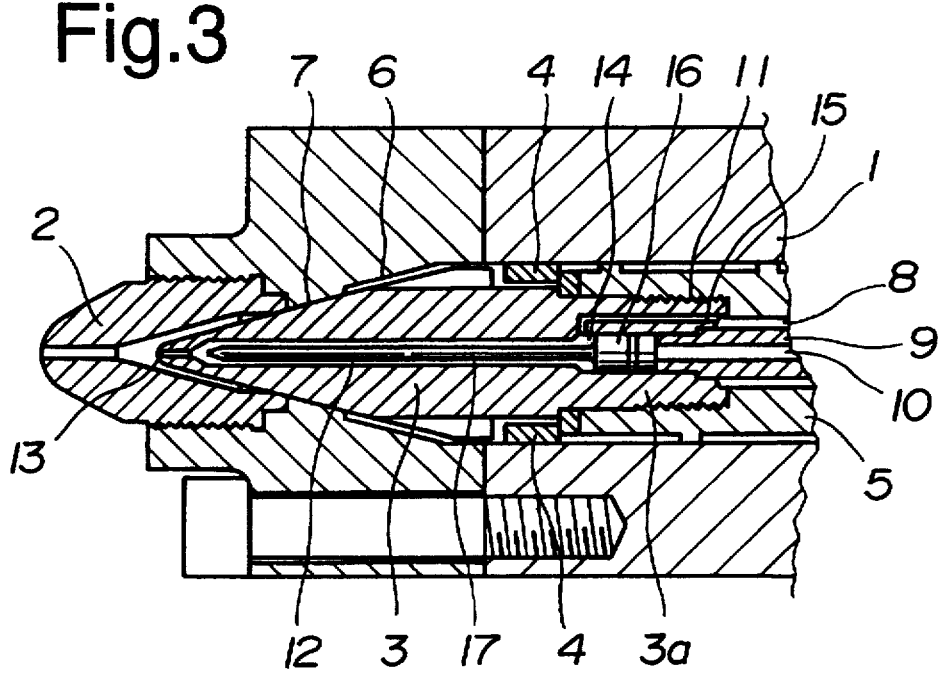

INJECTION APPARATUS FOR MOLDING SYNTHETIC RESIN HOLLOW OR FOAMED BODY

BACKGROUND OF THE INVENTION

1. Field of the Invention

This invention relates to an injection apparatus used to mold a resin into a hollow or foamed body by injecting a high-pressure gas into a resin in a mold after a synthetic resin is injected and filled into the mold.

2. Background Art

An injection apparatus disclosed in Japanese Patent Publication No. Hei 1-28690 contains a case of an injection gas in a front portion of an injection cylinder in such a manner that it is supported by an arm portion like a torpedo. A gas injection port of this case is formed like a nozzle and located at the rear of the nozzle at the front end of the injection cylinder and a gas switching valve for opening and closing the gas injection port is provided at the center of the inside thereof. This gas switching valve has a gas switching valve drive portion which is driven by a controller provided outside the injection cylinder.

A nozzle for injecting a high-pressure gas disclosed in Laid-open Japanese Utility Model Application No. Hei 4-71218 is constituted such that a plunger which has a gas flow passage is provided in a nozzle to be attached to the front end of an injection cylinder in such a manner that it can advance or retreat and the front end of the plunger is contacted to the injection port at the end of the nozzle by advancing the plunger by operating a lever from outside.

An injection apparatus disclosed in Japanese Patent Publication No. Sho 59-383 is constituted such that a needle which has a gas passage therewithin and can advance or retreat is provided in a nozzle to be attached to the front end of an injection cylinder such that it is always in elastic contact with the nozzle by a spring member, the injection of a gas is enabled in this elastic contact state, and the injection and filling of a resin is enabled when the needle retreats by resin pressure.

In the prior art disclosed in Japanese Patent Publication No. Hei 1-28690, since the case of an injection gas is incorporated in a front portion of the injection cylinder, the injection of the resin by the injection screw is carried out until the front end of the screw is contacted to the rear end of the case and the resin stays around the case each time injection is carried out. This residence causes much trouble required for material exchange and color change. Further, since there is a resin circulation space between the gas injection port and the nozzle at the front end of the injection cylinder, there is the possibility that a gas enters the injection cylinder because the high-pressure gas is injected after the injection and filling of the resin. Therefore, the gas switching valve must be driven by a controller by detecting the injection of a predetermined amount of the resin.

In the prior arts disclosed in Laid-open Japanese Utility Model Application No. Hei 4-71218 and Japanese Patent Publication No. Sho 59-383, the nozzle structure is more complicated than the structure of a nozzle member provided in a normal injection apparatus and a resin stays in the nozzle portion. In the former prior art, the plunger must be contacted to the nozzle by operating the plunger from outside each time the gas is injected. In the latter prior art, though the needle can be automatically contacted to the nozzle by a spring member, spring pressure must be set to a value larger than the resin pressure at the time of metering in order to prevent the leakage of the resin at the time of metering. However, it is extremely difficult to set spring pressure larger than back pressure due to limited nozzle space and length.

SUMMARY OF THE INVENTION

It is therefore an object of the present invention which has been made to solve the above problems of the prior art apparatuses to provide a new injection apparatus for molding synthetic resin hollow or foamed body which uses an injection screw or injection plunger to inject a high-pressure gas, thereby making it possible to inject a high-pressure gas after the injection and filling of a resin, like an injection apparatus of the prior art, and can open and close a gas flow passage automatically with the high-pressure gas.

The present invention according to the above object is characterized in that an injection apparatus for molding a synthetic resin hollow or foamed body comprises an injection screw having a detachable conical injection head at the front end thereof and a ring valve around a rear portion of the injection head, an injection cylinder the interior of a front end portion of which equipped with a nozzle member is formed as a tapered surface in accordance with the injection head and can be closed by its contact with the injection head and which contains the injection screw in such a manner that it can rotate and advance or retreat, a gas flow passage having a required inner diameter and provided from the front end of the injection head to a rear end portion of the injection screw, an opening/closing pin for the gas flow passage which is inserted into the gas flow passage in the injection head in such a manner that it can move together with a piston at the rear end of the injection head, and an actuation gas flow passage, provided in the gas flow passage behind the piston, for applying pressure to the piston so as to close the gas flow passage with the opening/closing pin.

Further, the present invention is characterized in an injection apparatus for molding a synthetic resin hollow or foamed body comprises an injection plunger having a detachable conical injection head at the front end thereof, an injection cylinder the interior of a front end portion of which equipped with a nozzle member is formed as a tapered surface in accordance with the injection head and can be closed by its contact with the injection head and which contains the injection plunger in such a manner that it can advance or retreat, a gas flow passage having a desired inner diameter and provided from the front end of the injection head to a rear end portion of the injection plunger, an opening/closing pin for the gas flow passage which is inserted into the gas flow passage in the injection head in such a manner that it can move together with a piston at the rear end of the injection head, an actuation gas passage, provided in the gas flow passage behind the piston, for applying pressure to the piston so as to close the gas flow passage with the opening/closing pin, a plasticizing cylinder having a plasticating screw in such a manner that it can rotate therewithin, a resin passage connected to both of front portions of the injection cylinder and the plasticizing cylinder, and a switching valve provided in a resin passage.

In the above constitution, after the resin metered in a front end portion of the injection cylinder is injected and filled into a mold by the advance of the injection screw or the injection plunger, a gas is injected from the front end of the injection screw or the injection plunger via the nozzle into the resin in the mold to mold the resin into a hollow or foamed body.

For the injection and filling of the resin, the opening/closing pin is moved by the pressure of the actuation gas which acts on the piston from the passage provided in the gas flow passage to close the gas flow passage in order to prevent the entry of the resin into the gas flow passage. For the injection of a gas, the front end portion of the cylinder is closed by the contact between the interior of the front end portion of the cylinder and the injection head to prevent the entry of the gas into the resin passage.

The gas flow passage for the injection of the gas can be automatically opened by moving the piston toward the rear by the initial pressure of the gas injected into the mold and retreating the opening/closing pin. Therefore, the supply of the gas is switched between the gas flow passage and the actuation gas flow passage to inject or stop the gas into the resin and the injection gas can be used as the actuation gas.

BRIEF DESCRIPTION OF THE DRAWINGS

The above and other objects and advantages of the present invention will become apparent from the following description with reference to the accompanying drawings, wherein:

FIG. 2 is an enlarged sectional view of an end portion of the injection apparatus;

FIG. 3 is an enlarged sectional view of an end portion when a high-pressure gas is injected.

DETAILED DESCRIPTION OF THE PREFERRED EMBODIMENTS

Figure 1:
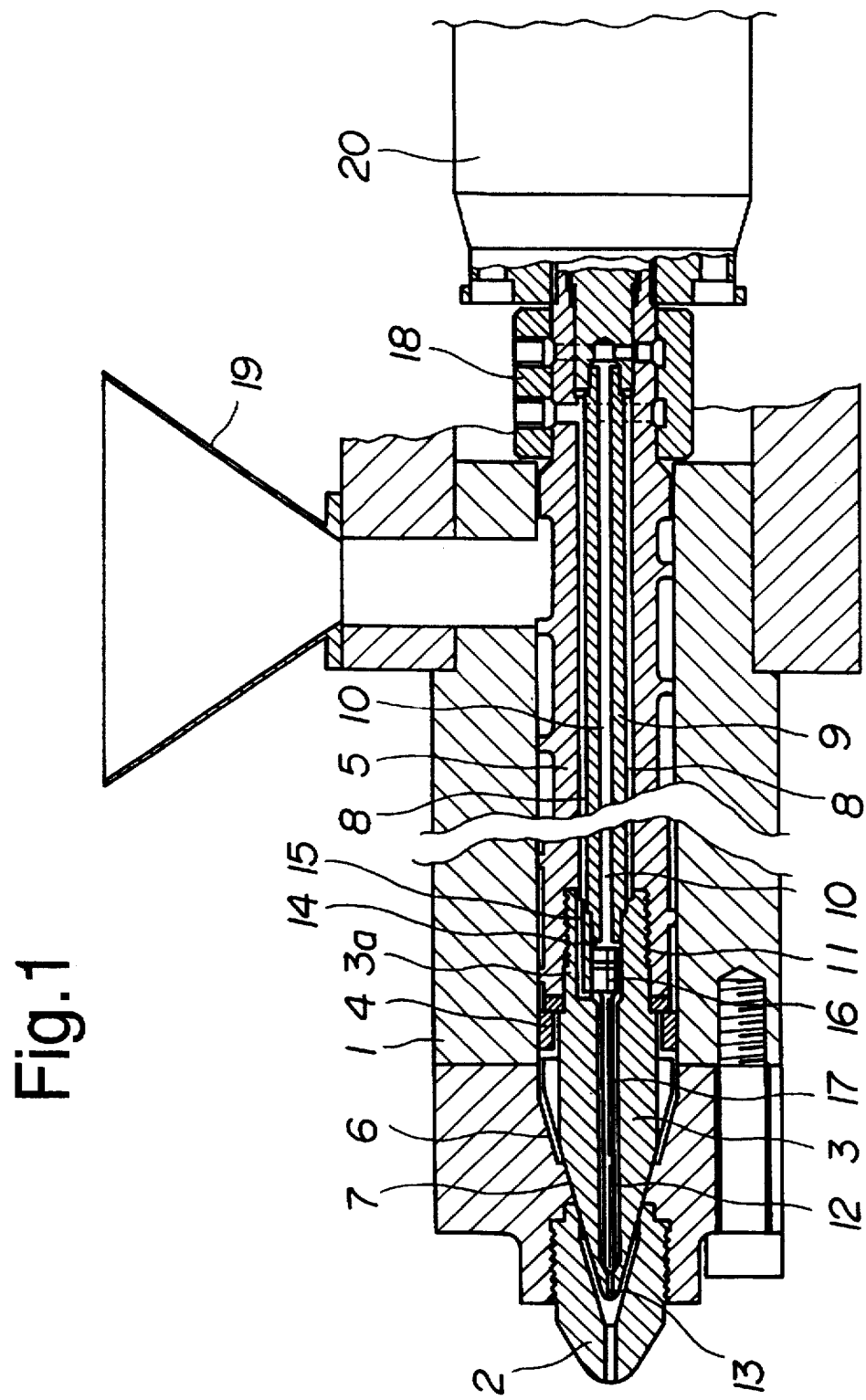
FIG. 1 is a vertical side view of an injection apparatus which completes injection and filing according to the present invention.

In the accompanying figures, reference 1 is an injection cylinder having a nozzle member 2 at the front end thereof. The injection cylinder 1 contains an ordinarily-structured injection screw 5 having a detachable conical injection head 3 at the front end thereof and a ring valve 4 around a rear portion of the injection head 3 in such a manner that the screw can rotate and advance or retreat.

The interior of the front end portion of the injection cylinder 1 equipped with the nozzle member 2 is formed as a tapered surface 6 in accordance with the above injection head 3 and can be closed by partial contact between a ring-shaped step portion 7 formed along the tapered surface and a tapered peripheral surface of the injection head 3.

Inside the above injection screw 5, there are provided a gas flow passage 8 having a required inner diameter and an actuation gas flow passage 10 formed by a pipe body 9 between front end and rear end portions thereof with the actuation gas flow passage 10 located in the center thereof. A front end portion of the actuation gas flow passage 10 is projected into a recess portion 11 at the front end of the screw which is formed to accept the above injection head 3.

The above injection head 3 has a gas flow passage 12 which is extended from the above gas flow passage 8 in the center thereof in an axial direction. A front end portion of this gas flow passage 12 is formed as an opening 13 having a smaller diameter than the gas flow passage 12 and a rear end portion 3a is formed as a cylinder 14 having a larger diameter than the gas flow passage 12 and an opening end portion. A connection passage 15 for connecting the gas flow passages 8 and 12 is provided from a front end portion of this cylinder 14 to the rear end of the injection head.

An opening/closing pin 17 having a piston 16 as an integral unit at the rear end thereof is inserted into the gas flow passage 12 and the cylinder 14 in the injection head in such a manner that it can move from a rear portion of the injection head in an axial direction before the injection head 3 is attached to the front end of the injection screw 5. When this injection head 3 is installed by fitting the rear end portion 3a in the recess portion 11 at the front end of the above injection screw 5, a front end portion of the pipe body 9 of the actuation gas flow passage 10 is mated with the cylinder to close the opening of the cylinder 14 and the opening end of the connection passage 15 is contacted to the opening end at the front end of the gas flow passage 8 to form a gas flow passage extending from a rear end portion of the screw to a front end of the injection head 3.

The above piston 16 advances or retreats together with the opening/closing pin 17 by the pressure of the high-pressure gas received alternately by front and rear surfaces thereof to open or close the opening 13 and prevents the molten resin from flowing back to the gas flow passage when the opening is closed. The cross section $A_1$ of the piston 16 and the cross section $A_2$ of the opening 13 preferably satisfy the following expression when the gas pressure is $P_1$ and the injection pressure is $P_2$.

$$P_1 \times A_1 > P_2 \times A_2$$

As long as this relational expression is satisfied, the entry of the molten resin into the gas flow passage 12 by opening the opening/closing pin by the injection pressure is prevented.

The above gas flow passage 8 and the actuation gas flow passage 10 are connected to a gas circuit equipped with a switching valve, not shown in the accompanying figures, through a ring-shaped gas connection member 18 installed around a rear end portion of the injection screw 5. Reference numeral 19 is a hopper and 20 an injection drive unit.

In the above embodiment, the plasticization and metering of the resin are carried out by the rotation of the injection screw 5. At this point, the opening 13 at the front end of the injection head 3 is closed by the opening/closing pin 17. This closure can be carried out easily by switching the switching valve in the gas circuit to supply part of a gas used for molding to the actuation gas flow passage 10 and pressure advancing the piston 16 with the initial pressure of the high-pressure gas.

The closure of this opening 13 is kept until the injection of a gas. After metering, the injection screw 5 advances to inject and fill the metered resin into a mold. The advance of the injection screw 5 is carried out until the tapered surface of the injection head 3 partially contacts the ring-shaped step portion 7 at the rear of the nozzle member 2 and the interior of the front end portion of the injection cylinder 1 is closed as shown in FIG. 3. The position of the injection screw is maintained by predetermined pressure and the step proceeds to the injection of a gas.

The injection of a gas into the resin filled into the mold can be carried out easily by switching the gas circuit to the gas flow passage 8 from the actuation gas flow passage 10 by the switching valve. The injected gas flowing into the gas flow passage 8 increases the initial pressure of the gas flow passage 8 extending to the injection head by the closure of the opening 13 and acts on the front end of the piston 16 to retreat the piston 16 together with the opening/closing pin 17. Thereby the gas flow passage 12 is opened and the high-pressure gas flows out into the nozzle member isolated from the interior of the injection cylinder and is injected from the nozzle member 2 into the inside of the resin filled into the mold to mold a hollow or foamed body. Therefore, simply by supplying an injection gas into the gas flow passage 8, the cancellation of the closure of the gas flow passage 12 by the opening/closing pin 17 and the injection of the high-pressure gas into the resin filled in the mold are carried out automatically.

When the gas circuit is switched to the actuation gas flow passage 10 after the completion of the injection of the high-pressure gas, the piston 16 advances together with the opening/closing pin 17 by the gas pressure to close the opening 13 again. Thereafter, the step proceeds to metering by the rotation of the injection screw 5.

Figure 4:
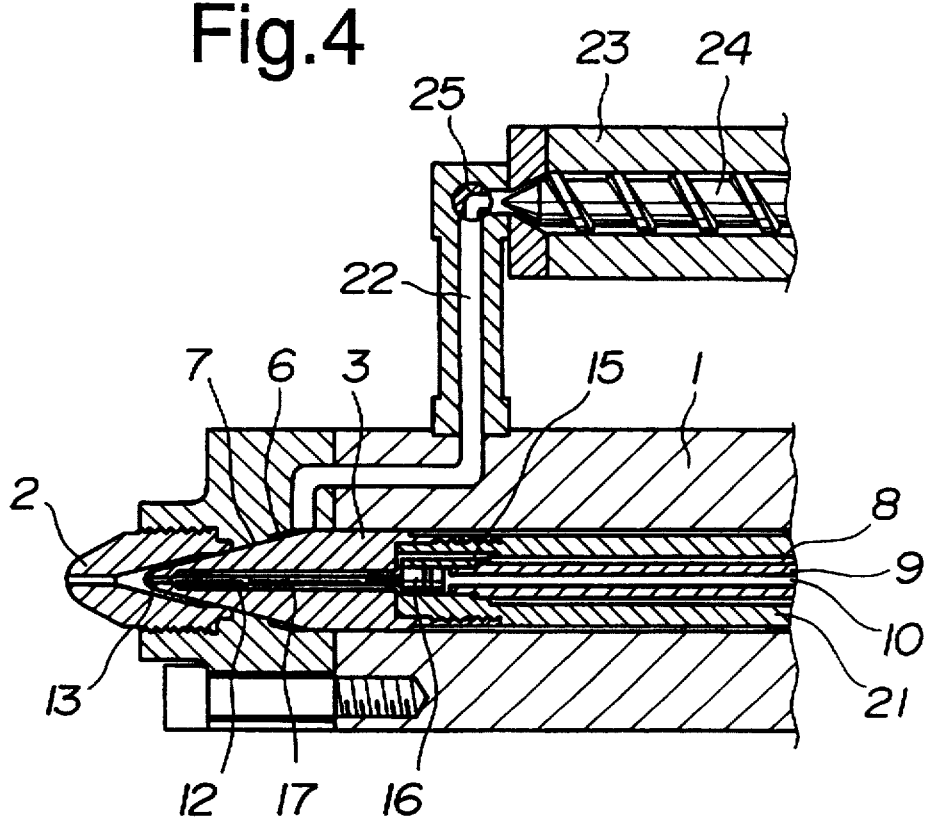
FIG. 4 is a vertical side view of an end portion of a preplasticizing injection apparatus according to the present invention.

The above mechanisms of the injection screw 5 can be applied directly for an injection plunger 21 for a preplasticizing injection apparatus without changing its basic structure, as shown in the embodiment of FIG. 4. In this case, the plasticization of a resin is carried out by the rotation of a screw 24 provided in a plasticizing cylinder 23 communicating with a front portion of the injection cylinder 1, the injection and filling into a mold of the resin metered in the front end portion of the cylinder are carried out through the same process as in the above embodiment after a switching valve 25 provided in a resin passage 22 is closed. Therefore, a detailed description thereof is omitted.

Not shown, the screw 23 of the plasticizing cylinder 22 can be replaced by a plunger.

As described on the foregoing pages, the present invention has the following effects because the interior of the front end portion of the injection cylinder is formed as a tapered surface in accordance with the conical injection head and can be closed by its contact with the injection head, a gas flow passage and an actuation gas flow passage for opening and closing the gas flow passage are provided between the front end portion to the rear end portion of the injection plunger or the injection screw, and the injection of a gas into a resin injected and filled can be carried out from the injection screw or the injection plunger by pressurizing the piston at the rear end of the opening/closing pin inserted into the gas flow passage in the injection head with gas pressure.

Since the basic outer structure of the injection screw or the injection plunger is the same as an ordinary one, the resin does not stay in a front end portion of the injection cylinder, flow resistance at the time of injection does not become large, the metering, injection and filling of the resin to be molded into a hollow or foamed body can be carried out as in the prior art, and much trouble is not required for material exchange and color change.

Since the gas flow passage can be closed with the high-pressure gas to be injected into the resin, the closed state can be maintained with higher pressure than spring pressure, the closure is carried out simply by switching from the gas flow passage to the actuation gas flow passage, and the resin can withstand injection pressure fully and does not leak into the gas flow passage.

Since the interior of the front end portion of the injection cylinder is closed by the contact between a tapered surface of the interior of the front end portion and the injection head upon completion of the injection of the resin and the closure can be maintained by the pressure force of the injection screw or the injection plunger, the high-pressure gas is prevented from flowing back to the injection cylinder without contacting the front end of the injection head to the nozzle member.

The injection screw and the resin passage of the plasticizing cylinder can be used for an ordinary preplasticizing injection apparatus by directly applying the internal structure of the injection screw to an injection plunger and providing a switching valve in the resin passage.

What is claimed is:

1. An injection apparatus for molding a synthetic resin hollow or foamed body comprising:

an injection screw having a detachable conical injection head at the front end thereof and a ring valve around a rear portion of the injection head;

an injection cylinder the interior of a front end portion of which equipped with a nozzle member is formed as a tapered surface in accordance with the injection head and can be closed by its contact with the injection head and which contains the injection screw in such a manner that it can rotate and advance or retreat;

a gas flow passage having a required inner diameter and provided from the front end of the injection head to a rear end portion of the injection screw;

an opening/closing pin for the gas flow passage which is inserted into the gas flow passage in the injection head in such a manner that it can move together with a piston at the rear end of the injection head; and an actuation gas flow passage, provided in the gas flow passage behind the piston, for applying pressure to the piston so as to close the gas flow passage with the opening/closing pin.

2. An injection apparatus for molding a synthetic resin hollow or foamed body comprising:

an injection plunger having a detachable conical injection head at the front end thereof;

an injection cylinder the interior of a front end portion of which equipped with a nozzle member is formed as a tapered surface in accordance with the injection head and can be closed by its contact with the injection head and which contains the injection plunger in such a manner that it can advance or retreat;

a gas flow passage having a required inner diameter and provided from the front end of the injection head to a rear end portion of the injection plunger;

an opening/closing pin for the gas flow passage which is inserted into the gas flow passage in the injection head in such a manner that it can move together with a piston at the rear end of the injection head;

an actuation gas passage, provided in the gas flow passage behind the piston, for applying pressure to the piston so as to close the gas flow passage with the opening/closing pin;

a plasticizing cylinder having a plasticating screw in such a manner that it can rotate therewithin;

a resin passage connected to both of front portions of the injection cylinder and the plasticizing cylinder; and a switching valve provided in a resin passage.

* * * * *